Aug. 4, 1931.  J. G. DINTILHAC  1,817,739
APPARATUS FOR DETERMINING THE FRICTIONAL QUALITIES OF A LIQUID
Filed July 31, 1928
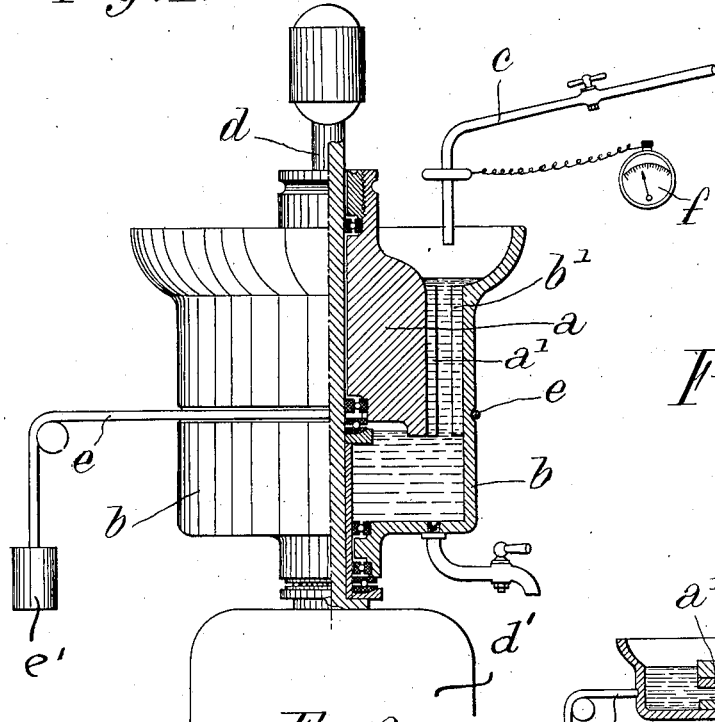
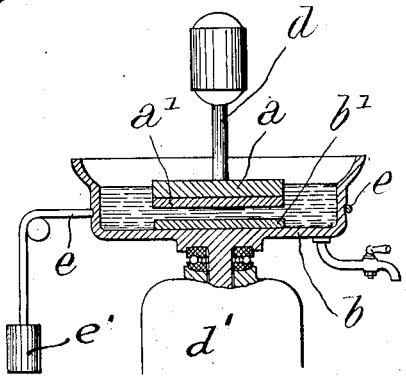
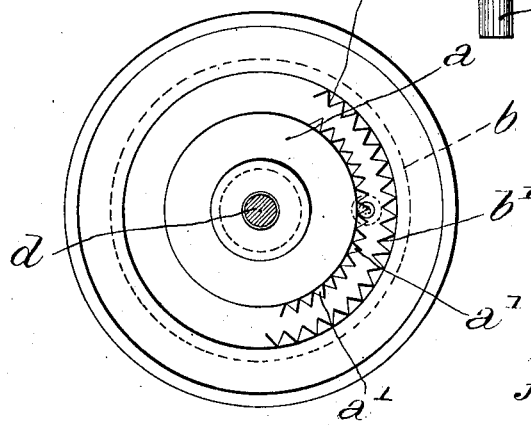
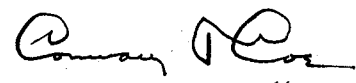
Inventor:
Jean Georges Dintilhac,
Att'y.

Patented Aug. 4, 1931

1,817,739

UNITED STATES PATENT OFFICE

JEAN GEORGES DINTILHAC, OF PARIS, FRANCE, ASSIGNOR TO THE SOCIETY "YACCO. S. A. F.," OF PARIS, FRANCE, A FRENCH SOCIETY

APPARATUS FOR DETERMINING THE FRICTIONAL QUALITIES OF A LIQUID

Application filed July 31, 1928, Serial No. 296,592, and in Belgium February 3, 1928.

The present invention relates to methods and apparatus for determining the frictional qualities of a liquid and, more particularly, the internal (intermolecular) friction thereof and the cofficient of friction between the liquid and a solid surface.

One of the objects of the invention is to provide a method and apparatus for measuring independently (1) the internal friction of any chosen liquid and (2) the coefficient of friction between said liquid and a chosen surface, both measurements being made, preferably, at high linear velocities.

Other objects will appear in the course of the detailed description now to be given with reference to the accompanying drawings, in which—

Fig. 1 is a partially sectional elevation of one illustrative embodiment of the invention;

Fig. 2 is a plan of the device represented in Fig. 1;

Fig. 3 is an axial section taken through another form of the invention.

Referring to the Figs. 1 and 2 of the drawings, $a$ is a solid cylinder rotatably mounted on suitable ball-bearings supported by a vertical shaft $d$ driven by a motor $d'$ at a predetermined speed; $b$ is a container having lateral cylindrical walls concentric with cylinder $a$ and supported on ball-bearings mounted on a support $d^1$. Elements $a$ and $b$ are provided with corrugations, teeth or blades $a^1$ and $b^1$ respectively adapted to "take hold" of the liquid in container $b$. The apparatus is completed by a liquid supply conduit $c$, a thermometer $f$ adapted to measure the temperature of the liquid contained in the latter, and a dynamometer $e$ in the form of a wire $e$ connected to weights $e'$ or other means adapted to exert a measurable traction.

The device shown in Fig. 3 differs only in the orientation of elements $a^1$ and $b^1$ which are here arranged horizontally instead of vertically. Container $b$ should be of sufficient diameter to render the frictional effect between the lateral walls and the liquid negligible.

The device operates as follows:—oil or a similar liquid is poured into container $b$, the temperature thereof being first noted; the motor $d'$ coupled to shaft $d$ is then set in motion at a measured speed and drives cylinder $a$ through the liquid to be measured; teeth $a^1$ on cylinder $a$ "take hold" of the liquid and set the latter in motion; this motion is communicated via the liquid to teeth $b^1$ and sets container $b$ in motion. It suffices then to apply a measurable frictional force by means of $e$, $e'$ or any equivalent dynamometer to bring $b$ to rest and to thus determine the shearing effect exerted by the liquid in contact with $a^1$ and $b^1$ on the remaining liquid lying between these elements. By changing the diameter of either $a$ or $b$ i. e. by varying the thickness of the oil layer being measured, coefficients of internal friction may be obtained for varying oil thicknesses. Similarly, by varying the temperature or the nature of the liquid or oil, tables of coefficients may be established relatively to any given temperature or to any liquid chosen as a standard. It is important to choose the form of surfaces $a^1$ and $b^1$ so that the measurements really indicate the frictional effect between liquid and liquid whatever the form of the surfaces of these elements may be, it is advisable that they terminate in a sharp point or line so that the frictional effect of those points which are immediately in contact with the moving liquid is reduced to a minimum. Obviously, the various toothed elements on cylinder $a$ should project outwardly substantially to the same height and the same should be true for the toothed elements formed inside of $b$.

What I claim is:—

1. In an apparatus of the class described, the combination of a pair of rotatable elements having surfaces out of contact with one another, each of said elements having a plurality of protruding portions formed thereon adapted to "take hold" of a liquid in contact therewith, means for rotating one of said elements, and means for exerting a braking action on the other element.

2. An apparatus for measuring the internal friction of a liquid comprising a pair of rotatable elements mounted out of contact with one another, each of said elements being provided with a plurality of ribs tapering radially, said ribs being adapted to "take hold" of a liquid in contact therewith, means for rotating one of said elements, and means for exerting a braking action on the other element.

In testimony whereof I have hereunto set my hand.

JEAN GEORGES DINTILHAC.